United States Patent [19]
Olashaw et al.

[11] 3,967,165
[45] June 29, 1976

[54] SWITCHBOARD APPARATUS HAVING CONTROL WIRING PASSAGEWAYS

[75] Inventors: William Francis Olashaw, Plainville; Roger Thomas Wilbur, Bristol, both of Conn.

[73] Assignee: General Electric Company, New York, N.Y.

[22] Filed: Mar. 25, 1975

[21] Appl. No.: 561,866

[52] U.S. Cl. .............................. 317/120; 317/122; 174/16 R
[51] Int. Cl.² .......................................... H02B 1/20
[58] Field of Search .......... 317/100, 119, 120, 122; 174/15 R, 16 R, 16 HS, 16 B, 70 B

[56] References Cited
UNITED STATES PATENTS

| | | | |
|---|---|---|---|
| 2,140,376 | 12/1938 | Anderson | 317/122 |
| 3,274,451 | 9/1966 | Laity | 317/122 |
| 3,840,785 | 10/1974 | Olashaw | 317/119 |

*Primary Examiner*—Gerald P. Tolin
*Attorney, Agent, or Firm*—Robert A. Cahill; Walter C. Bernkopf; Frank L. Neuhauser

[57] ABSTRACT

An electrical switchboard cabinet incorporates isolated, vertically and horizontally extending wiring passageways for accommodating the routing of control wires between electrical devices in one switchboard vertical section, between electrical devices in different switchboard sections, and between switchboard devices and switchboard terminal locations where electrical connections to remote control locations are effected.

8 Claims, 3 Drawing Figures

SWITCHBOARD APPARATUS HAVING CONTROL WIRING PASSAGEWAYS

BACKGROUND OF THE INVENTION

The present invention relates to electrical switchgear and switchboard apparatus, and particularly to enclosure or cabinet constructions incorporating isolated passageways for routing control wires about the cabinet interior.

In many switchboard and switchgear applications, the electrical devices incorporated therein, e.g., circuit breakers, switches, controllers, etc., are externally controlled. Circuit breakers, for example, may be equipped with motor operators, shunt trips, ground fault protection, bell alarms, all of which require external control wiring. The routing of control wiring within the cabinet interior must be carried out judiciously so as not to interfere with installation and maintenance of the switchboard, and particularly such that the control wiring is protected from inadvertent damage. The current practice is to harness control wires together and to secure these harnesses to switchboard structural members at intervals along their runs. However, the control wiring harnesses are typically exposed, and thus the wires are susceptible to damage. Moreover, sharp corners and burrs on these structural members can abrade and cut the control wire insulation during installation and operation. In some instances, accessorial troughs are attached to switchboard structural members in positions to accommodate segments of the control wire runs. These accessorial wiring troughs are typically flimsy in construction and difficult to install, thus complicating the assembly of the switchboard and switchgear apparatus.

It is accordingly an object of the present invention to provide electrical switchboard and switchgear apparatus having improved provisions for accommodating the routing of control wiring throughout the cabinet interior.

An additional object is to provide apparatus of the above character wherein enclosed, control wiring passageways are integrally incorporated into cabinet support structure.

A further object is to provide apparatus of the above character wherein the passageways are readily accessible for installation and maintenance of the control wiring.

A further object of the present invention is to provide apparatus of the above character which is simple in design, easy to assemble and readily maintainable.

Other objects of the invention will in part be obvious and in part appear hereinafter.

SUMMARY OF THE INVENTION

In accordance with the present invention, there is provided an improved cabinet construction for electrical switchboard and switchgear apparatus. More specifically, the cabinet construction of the invention includes improved provisions for routing control wiring throughout the cabinet interior in an expeditious and protected manner. To this end, according to one embodiment of the invention, vertical, closed wiring passageways are integrated into members serving to support the electrical buswork and the electrical devices of the switchboard apparatus. These support members consist of modular mounting panels, each identically formed having a base plate secured adjacent its lateral edge portions to the cabinet framework. The panels are arranged in end-to-end vertical relation, and thus their base plates serve as rear barrier walls for the forward cabinet compartments accommodating the various electrical devices. Each base plate carries elongated, upstanding ribs defining elongated channels for the vertical bus which are bolted in place. The mounting panels include additional, outboard ribs serving to define vertical control wiring passageways to each side of the vertical bus channels. Pre-formed openings in the panel base plates accommodate the routing of control wires between the device compartments and these wiring passageways. These vertical wiring passageways, as well as the vertical bus channels, are preferably closed off by insulative barrier sheets, so as to effectively isolate and protect the control wiring during service.

The upper and lower open ends of these vertical control wiring passageways communicate with horizontal wiring troughs extending across the top and bottom, respectively, of the cabinet. These troughs accommodate the routing of control wiring between switchboard vertical sections and to conduit through which the control wiring is routed to locations remote from the electrical switchboard and switchgear apparatus.

In some applications, it is desired to route the control wiring from each front compartment to the rear of the cabinet, well beyond the buswork where servicing of the control wiring can be carried out readily and with relative safety. To accommodate this situation, at least one, and preferably two enclosed vertically extending passageways are located adjacent the rearward corners of the cabinet. A pipe, preferably of insulating material, has its forward end mounted in an aperture formed in the mounting panel base plate and its rearward end mounted in an opening formed in the rearward, vertically extending passageway. The control wires are fished through these pipes from the compartment area back to the rear passageway where they are electrically connected to a terminal block. One or two such pipes are provided for each device compartment. From the terminal blocks in the rear passageways, the control wires are routed up and/or down to terminal locations where the control wire exits the switchboard apparatus for routing through conduit to a remote location. Also, the control wires can be routed between device compartments through the pipe and rear wiring passageway. The rearward control wiring passageways are accessible through a readily removable sectional cover arrangement.

The invention accordingly comprises the features of construction, combinations of elements, and arrangement of parts which will be exemplified in the description hereinafter set forth, and the scope of the invention will be indicated in the claims.

For a better understanding of the nature and objects of the invention, reference should be had to the following detailed description taken in conjunction with the accompanying drawings, in which.

Corresponding reference numerals refer to like parts throughout the several views of the drawings.

DETAILED DESCRIPTION

Figure 1:
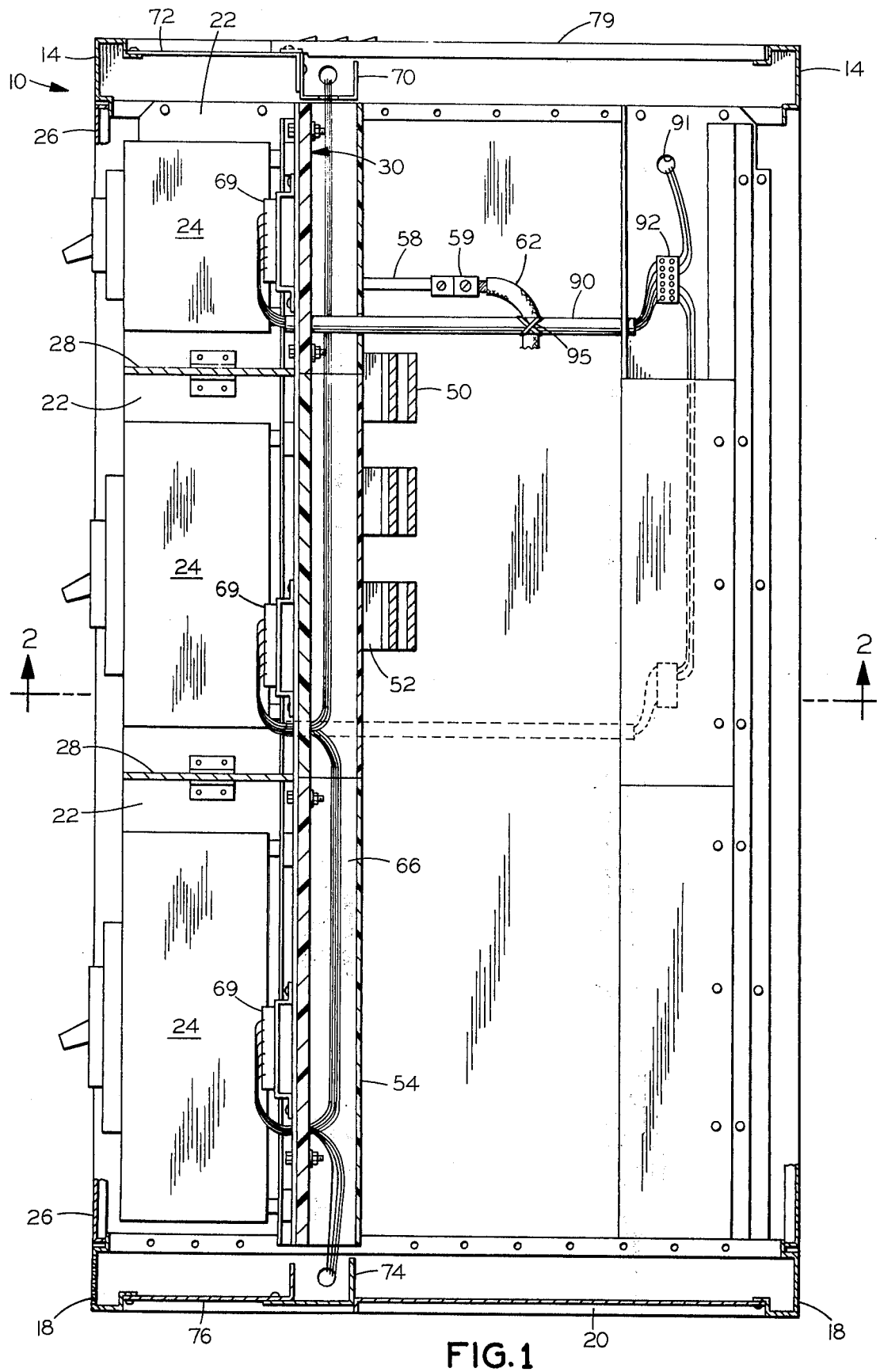
FIG. 1 is a side elevational view of an electrical switchboard or switchgear apparatus constructed in accordance with the present invention.
Figure 2:
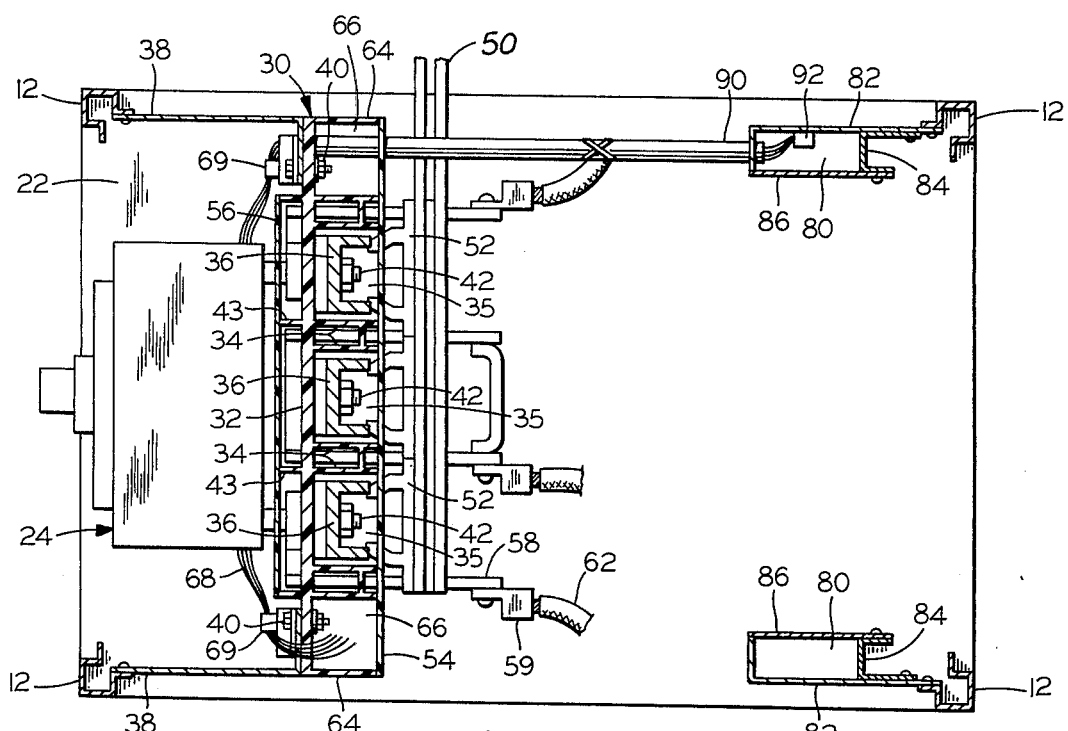
FIG. 2 is a sectional view taken along line 2—2 of FIG. 1.
Figure 3:
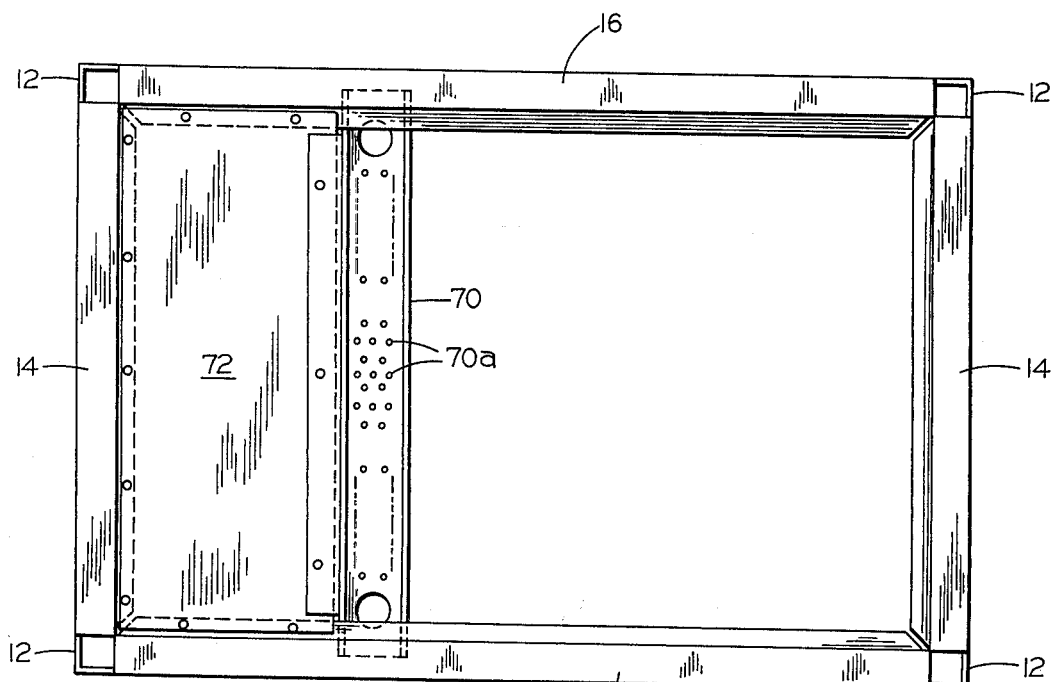
FIG. 3 is a plan view of FIG. 1 with the cover removed.

The electrical switchboard apparatus of the present invention comprises, as seen in FIGS. 1 and 2, a cabinet, generally indicated at 10, a cubicle frame consisting of upright corner posts 12, upper front and back cross frame members 14, upper side frame members 16 (FIG. 3), lower front and back cross frame members 18, and lower side frame members 20. In the front portion of the cabinet, there is provided a plurality of stacked compartments 22 accommodating electrical devices, such as circuit breakers 24, to which individual access is gained through a series of compartment doors 26. Horizontal partitions 28 provide isolation between compartments.

In the manner disclosed in U.S. Pat. No. 3,840,785, assigned to the assignee of the instant application, a vertical array of modular, insulative mounting panels, generally indicated at 30, isolate the device compartment 22 from the back portion of the cabinet 10. As best seen in FIG. 2, each mounting panel includes a base plate 32. Upstanding from the base plate and extending the full height of each mounting panel are four sets of paired ribs 34 defining three vertically extending channels 35 in which are accommodated vertical busbars 36. The mounting panels 30 are supported by L-shaped mounting partitions 38 affixed to the front corner posts 12. The marginal portions of the base plate 32 beyond the outboard sets of ribs 34 are clamped to the inwardly turned portions of the mounting partitions 38 affixed to the front corner posts 12. The marginal portions of the base plate 32 beyond the outboard sets of ribs 34 are clamped to the inwardly turned portions of the mounting partitions 38 by a series of bolts 40. The mounting partitions 38 also serve as sidewalls for the device compartments 22. With the channels 30 thusly mounted by the cabinet framework, the panels can serve as the sole means of support for the vertical busbars 36. To this end, as disclosed in the above-noted U.S. Pat. No. 3,840,785, the vertical busbars are clamped to the mounting panels in their respective channels by a series of bolts 42. The circuit breakers 24 are, in turn, supported by and electrically connected to the vertical bus by line straps extending through openings in the panel base plates 32. Additional ribs 43 upstanding from the front side of the base plates provide inter-phase isolation for these line straps bolted at their forward ends to the circuit breaker line terminals and at their rearward ends to the vertical bus.

Feeding the vertical bus 36 are horizontal bus 50, illustrated as two busbars per phase for increased current carrying capacity, respectively supported by and electrically connected to the vertical bus by brackets 52. These brackets have leg portions which are welded to the vertical bus and a bridging portion to which the horizontal bus is clamped by bolts (not shown). This manner of mounting and electrically connecting the horizontal bus to the vertical bus is disclosed in greater detail in the above-noted patent. Insulative barrier sheets 54 are secured across the free edges of ribs 34 to isolate the vertical bus in their respective channels. Brackets 52 reach through openings provided in these barrier sheets to the vertical bus. In addition, a barrier sheet 56 is secured across the free edges of ribs 43 in the device compartment 22 so as to isolate the line straps. Load straps 58 electrically connected at their forward ends to the load terminals of the circuit breakers 24 are arranged to pass through the mounting panels 32 in the spaces between paired rib sets 34. As a consequence, the ribs serve to isolate these load straps from the vertical bus during their rearward extension through openings in barrier sheet 54 to terminations beyond the horizontal bus 50. Electrical connectors 59 bolted to the rear terminations of these load straps facilitate electrical connection to load cable 62.

In accordance with the present invention, the mounting panels 30 are provided with additional ribs 64 extending rearwardly from the lateral edges of base plate 32 so as to cooperate with the base plate, the barrier sheet 54, and the outboard rib sets 34 to provide a pair of vertically extending control wiring passageways 66. With the mounting panels stacked end-to-end in vertical relation, these passageways 66 run the full height of the cabinet on each side of the switchboard vertical section. Control wires 68 are brought out from the circuit breaker 24 to terminal blocks 69 within the compartment 22. From these terminal blocks, the control wiring is routed through openings in base plates 32 in passageways 66. Once in the passageways, the control wiring may be routed upwardly or downwardly and back into one of the other compartments 22 in the same switchboard vertical section. Some of the control wiring will be routed upwardly to a trough 70 (FIGS. 1 and 3) mounted horizontally by an L-shaped partition 72 for extension across the top of the switchboard section. The control wiring runs through this trough for routing to other switchboard sections and through conduit (not shown) for routing to a location remote from the switchboard or switchgear apparatus. Alternatively, or in addition, some of the control wiring may be routed downwardly to a trough 74 mounted by another L-shaped partition 76 for extension across the bottom of the switchboard section. The control wiring runs in this trough to other switchboard vertical sections and through conduit (not shown) to remote control locations.

To supplement the control wiring passageways 66, the present invention provides for additional vertical wiring passageways 80 located adjacent to rear corners of the cabinet 10. As best seen in FIG. 2, these rear passageways are formed by L-shaped partitions 82 affixed to the rear corner posts and to which are affixed J-shaped members 84. These members define the sides and back of the passageways 80 to which access is gained by removable, sectional covers 86. Control wiring from the device compartments is fished through insulative pipes 90 to the rearward passageways 80. The forward ends of these pipes are mounted in apertures in the mounting panel base plate 32 while the rearward ends are mounted in openings provided in the inwardly turned terminations of the members 82. Preferably, terminal blocks 92 are provided in passageways 80 adjacent the points where the control wiring from the compartments 22 enter the passageways. From these terminal blocks 92, the control wiring may be routed upwardly or downwardly and back through other pipes 90 to other device compartments 22 in the same switchboard section. The control wiring exits the passageways 80 through suitable openings, for example, holes 91 in members 82, to adjacent switchboard sections or through conduit to remote control locations.

It will be appreciated that the passageways 66 and troughs 70, 74 may be used in conjunction with pipes 90 and rear passageways 80 to provide great flexibility in routing control wiring throughout the interior of a switchboard section, as well as between switchboard sections. In addition, the pipes 90 can conveniently serve as stanchions for the load cables 62 by being secured thereto by ties 95.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. Electrical switchboard apparatus comprising, in combination:
    A. a cabinet;
    B. a cabinet frame
    C. a plurality of modular, insulative mounting panels arranged in end-to-end vertical relation throughout the height of said cabinet, each said panel including:
        1. a base plate having lateral marginal portions affixed to said frame,
        2. a plurality of spaced, parallel ribs outstanding from the rearward side of said base plate to define a plurality of vertically elongated channels, and
        3. an additional rib outstanding from each lateral edge portion of said base plate, each said additional rib cooperating with its adjacent channel defining rib to provide a vertical passageway,
        4. with said panels in end-to-end vertical relation, said channels and passageways extending substantially the full height of said cabinet;
    D. a vertical array of compartments in said cabinet located forwardly of said panels, each said compartment accommodating an electrical device;
    E. an elongated vertical busbar located in each said channel and mounted to said panels; and
    F. control wiring for the electrical devices running from said compartments through apertures in said base plate into said passageways.

2. The electrical switchboard defined in claim 1, which further includes an insulative barrier sheet affixed across the free edges of said ribs to enclose said passageways and said channels.

3. The switchboard apparatus defined in claim 2, which further includes a wiring trough affixed to said frame for extension horizontally across said cabinet, said trough communicating with terminations of said passageways to receive said control wiring routed therethrough.

4. The switchboard apparatus defined in claim 3, wherein separate wiring troughs are affixed to said frame for extension horizontally across the top and bottom of said cabinet, said troughs communicating with the upper and lower terminations of said passageways to receive said control wiring therefrom for further routing.

5. The switchboard apparatus defined in claim 1, wherein the lateral marginal portions of said base plate affixed to said frame are located inwardly of said additional ribs.

6. The switchboard apparatus defined in claim 5, wherein each said channel defining rib is constituted by a closely spaced rib pair, and said apparatus further includes load straps extending rearwardly from said electrical devices in said compartments through said mounting panels at locations between said paired ribs.

7. The switchboard apparatus defined in claim 1, which further includes a vertically elongated rearward passageway located adjacent each rear corner of said cabinet, and insulative pipes mounted at their forward ends in apertures in said mounting panels and at their rearward ends in apertures in said rearward passageways, said control wiring routed through said pipes from said compartments to said rearward passageways.

8. The apparatus defined in claim 7, wherein said rear passageways are accessible through removable sectional covers.

* * * * *